(12) United States Patent
Shiraishi et al.

(10) Patent No.: US 9,588,878 B2
(45) Date of Patent: Mar. 7, 2017

(54) COMPUTER HAVING SELF-MONITORING FUNCTION AND MONITORING PROGRAM

(71) Applicants: TOYOTA JIDOSHA KABUSHIKI KAISHA, Aichi (JP); BTC JAPAN CO., LTD., Tokyo (JP)

(72) Inventors: Shinichi Shiraishi, Minato-ku (JP); Masaharu Akei, Minato-ku (JP); Taichi Ando, Bunkyo-ku (JP)

(73) Assignees: TOYOTA JIDOSHA KABUSHIKI KAISHA, Aichi (JP); BTC JAPAN CO., LTD, Tokyo (JP)

(*) Notice: Subject to any disclaimer, the term of this patent is extended or adjusted under 35 U.S.C. 154(b) by 130 days.

(21) Appl. No.: 14/423,309

(22) PCT Filed: Aug. 22, 2013

(86) PCT No.: PCT/JP2013/072439
§ 371 (c)(1),
(2) Date: Feb. 23, 2015

(87) PCT Pub. No.: WO2014/030707
PCT Pub. Date: Feb. 27, 2014

(65) Prior Publication Data
US 2015/0261660 A1    Sep. 17, 2015

(30) Foreign Application Priority Data
Aug. 23, 2012 (JP) .................... 2012-184540

(51) Int. Cl.
G06F 11/00    (2006.01)
G06F 11/36    (2006.01)

(52) U.S. Cl.
CPC ...... *G06F 11/3688* (2013.01); *G06F 11/3672* (2013.01); *G06F 11/3692* (2013.01)

(58) Field of Classification Search
CPC ............. G06F 11/0739; G06F 11/3013; G06F 11/3672; G06F 11/3688; G06F 11/3692
See application file for complete search history.

(56) References Cited

U.S. PATENT DOCUMENTS

| 5,724,504 A | 3/1998 | Aharon et al. |
| 2003/0009271 A1 | 1/2003 | Akiyama |

(Continued)

FOREIGN PATENT DOCUMENTS

| JP | 2002-268729 A | 9/2002 |
| JP | 2003-019931 A | 1/2003 |
| JP | 2013-077048 A | 4/2013 |

OTHER PUBLICATIONS

OBD-II Background (URL: http://www.obdii.com/background.html), B&B Electronics, (retrieved Apr. 2, 2015) pp. 1-4.

(Continued)

*Primary Examiner* — Joshua P Lottich
(74) *Attorney, Agent, or Firm* — Sughrue Mion, PLLC

(57) ABSTRACT

A computer comprises an input unit configured to acquire an input operation; a first program execution unit configured to execute a computing program performing a computation based on the input operation acquired by the input unit; a test scenario storage unit configured to store a plurality of test scenarios for the computing program; and a second program execution unit configured to execute a monitoring program determining whether or not the input operation acquired by the input unit corresponds to any of the plurality of the stored test scenarios.

12 Claims, 9 Drawing Sheets

(56) References Cited

U.S. PATENT DOCUMENTS

| | | | |
|---|---|---|---|
| 2008/0183484 A1* | 7/2008 | Kondo | G05B 23/0272 |
| | | | 705/1.1 |
| 2009/0006893 A1* | 1/2009 | Higashi | G06F 11/2242 |
| | | | 714/25 |
| 2010/0192128 A1 | 7/2010 | Schloegel et al. | |
| 2013/0018567 A1* | 1/2013 | Lim | F02D 41/021 |
| | | | 701/102 |
| 2015/0046133 A1* | 2/2015 | Morita | G06F 17/5009 |
| | | | 703/2 |

OTHER PUBLICATIONS

International Search Report for PCT/JP2013/072439 dated Nov. 19, 2013 [PCT/ISA/210].

* cited by examiner

COMPUTER HAVING SELF-MONITORING FUNCTION AND MONITORING PROGRAM

CROSS REFERENCE TO RELATED APPLICATIONS

This application is a National Stage of International Application No. PCT/JP2013/072439 filed Aug. 22, 2013, claiming priority based on Japanese Patent Application No. 2012-184540 filed Aug. 23, 2012, the contents of all of which are incorporated herein by reference in their entirety.

TECHNICAL FIELD

The present invention relates to a computer having a self-monitoring function and a monitoring program.

BACKGROUND ART

In recent years, it is common to control the state of equipment using an embedded system. For example, a computer mounted on an automobile is called ECU (electric control unit), and performs various controls related to running. The control computer in such an embedded system is widely used in fields other than the automobile such as a plant, a production line, or the like.

In the control computer represented by ECU, it is necessary to guarantee that a program operates according to specifications properly. This is because, when an unexpected operation occurs due to the breakdown of a circuit or the failure of the program, it becomes impossible to normally control a vehicle or a line so that safely of a user is threatened.

In the control computer, a self-diagnosis function is often provided in order to prevent an accident caused by the breakdown or failure. In the case of the automobile, the self-diagnosis function is called "Diagnosis" or "OBD (On-board diagnostics)" (see Non Patent Literature 1). The self-diagnosis function is capable of detecting an abnormal state such as the occurrence of an undefined signal or the like in the computer, and issuing an alarm to a user, stopping the system, and recording log information.

CITATION LIST

Non Patent Literature

[Non Patent Literature 1] "ODB-II On-Board Diagnostics", [online], B&B Electronics, [retrieved on Jul. 23, 2012], the Internet <URL:http://www.obdii.com/>

SUMMARY OF INVENTION

The computer having the self-diagnosis function described above is capable of detecting an abnormal operation caused by the breakdown of the circuit or the failure of the program and issuing an alarm to the user. However, the self-diagnosis function is capable of detecting that the system is brought into the abnormal state, but is not capable of detecting that the system is in what is called "an unchecked state" that is the state of the system before the abnormal operation of the system occurs.

This problem will be described in detail. In a software test, a test scenario is usually generated by assuming operations performed by the user. However, it is not easy to completely cover all cases, and an unassumed operation is often performed. In the case where the unassumed operation is performed, software has to handle an unchecked scenario so that it is not possible to guarantee that processing is performed normally. That is, there is a possibility that a failure occurs in the scenario, and the system becomes unstable or the abnormal operation is caused. Such an unchecked state is not a critical state, but an operational risk of the software is present in the state, and hence it is desirable to positively detect the state and provide a notification. However, in the conventional art, it has not been possible to detect whether or not a running program in the computer operates according to the checked scenario.

The invention has been achieved in view of the above problem, and an object thereof is to provide a computer having a self-monitoring function and a monitoring program capable of detecting that a user has performed an operation that does not exist in a test scenario.

A first aspect of the present invention is a computer having a self-monitoring function.

The computer according to the first aspect of the present invention includes an input unit configured to acquire an input operation, a first program execution unit configured to execute a computing program performing a computation based on the input operation acquired by the input unit, a test scenario storage unit configured to store a plurality of test scenarios for the computing program, and a second program execution unit configured to execute a monitoring program determining whether or not the input operation acquired by the input unit corresponds to any of the plurality of the stored test scenarios.

The computing program is a program serving as a monitoring target, and is a program that performs the computation based on the input operation acquired via the input unit provided in the computer. The input unit is a human interface device such as a mouse, a touch panel, or a keyboard, and the input operation denotes information inputted from a user through the device. Specifically, the input operation may be an event directly related to hardware such as a click, a tap, or a key press, or may also be a value inputted via a GUI (Graphical User Interface) component such as a text box, a drop-down list, or a slider.

The monitoring program is a program that acquires the input operation by a user and determines whether or not the input operation is already checked. The determination of whether or not the input operation is already checked is performed by comparing the acquired input operation with the plurality of the stored test scenarios. The test scenario is data in which the operation related to the test of the computing program is recorded, and the monitoring program can determine whether or not the input operation is already checked by confirming whether or not the acquired input operation matches the detail of the operation recorded in the test scenario.

Each of the test scenarios may include details and an order of a plurality of the input operations, and the monitoring program may acquire a plurality of the input operations from the input unit and, in a case where the plurality of the acquired input operations match the details and the order of the input operations included in any of the test scenarios, the monitoring program may determine that the acquired input operation corresponds to the test scenario.

Thus, the checking target may be a plurality of the input operations. That is, it is possible to determine whether or not the inputted operation corresponds to the test scenario by comparing the operations inputted successively from the input unit with the operations chronologically recorded in the test scenario and checking whether or not the contents and the order of the inputted operations match those of the recorded operations.

In addition, the monitoring program may notify the computing program or an external program that a system is in an unchecked state in a case where the acquired input operation does not correspond to any of the plurality of the stored test scenarios.

In the case where the operation performed by the user does not correspond to any of the plurality of the stored test scenarios, it can be determined that the operation is an unchecked operation. In this case, the monitoring program notifies the computing program or the external program of the situation in which the operation is not checked. With this, it is possible to perform processing coping with an abnormality occurrence such as output to a system log, notification to an external system, or transition to a safe mode, and assure the safety of the system.

A second aspect of the present invention is a monitoring program that monitors any program.

The monitoring program according to the second aspect of the present invention is a monitoring program executed simultaneously with a computing program performing a computation and monitoring an input operation to the computing program including an input acquisition step of acquiring the input operation to the computing program, and an input determination step of determining whether or not the acquired input operation corresponds to any of a plurality of pre-stored test scenarios for the computing program.

In addition, each of the stored test scenarios may include details and an order of a plurality of the input operations, the input acquisition step may include acquiring a plurality of the input operations, and in a case where the plurality of the acquired input operations match the details and the order of the input operations included in any of the test scenarios, the input determination step may include determining that the acquired input operation corresponds to the test scenario.

Further, in a case where the acquired input operation does not correspond to any of the plurality of the stored test scenarios in the input determination step, a step of notifying the computing program or an external program that a system is in an unchecked state may be executed.

Thus, the present invention can be defined as the monitoring program that monitors the input operation to any program.

A third aspect of the present invention is a software generation device that generates a computing program that performs a computation and a monitoring program that monitors an input operation to the computing program.

The software generation device according to the third aspect of the present invention includes a computing program input unit configured to receive an input of a code of the computing program, a test scenario input unit configured to receive an input of a plurality of test scenarios for the computing program that are described in a modeling language, a computing program generation unit configured to generate the computing program, a monitoring program generation unit configured to generate the monitoring program including the plurality of the test scenarios and determining whether or not the input operation to the computing program corresponds to any of the plurality of the test scenarios, and a program writing unit configured to record the computing program and the monitoring program in an object computer, and the computing program generation unit adds processing for notifying the monitoring program of the input operation performed to the computing program, with predetermined processing being performed by the computing program used as a trigger on the computing program.

In addition, each of the test scenarios may include details and an order of a plurality of the input operations, and the monitoring program may acquire a plurality of the input operations and, in a case where the plurality of the acquired input operations match the details and the order of the input operations included in any of the test scenarios, the monitoring program may determine that the acquired input operation corresponds to the test scenario.

Further, the monitoring program may be capable of notifying the computing program or an external program that a system is in an unchecked state in a case where the acquired input operation does not correspond to any of the plurality of the test scenarios.

Thus, the present invention can be defined as the software generation device that records the computing program and the monitoring program in the computer according to the first aspect of the present invention. Note that the above processing and units can be combined arbitrarily and implemented as long as no technical conflicts occur.

According to the present invention, it is possible to provide the computer having the self-monitoring function and the monitoring program capable of detecting that the user has performed the operation that does not exist in the test scenario.

DESCRIPTION OF EMBODIMENTS

First Embodiment

<Summary of Program Development Method>

Figure 1:
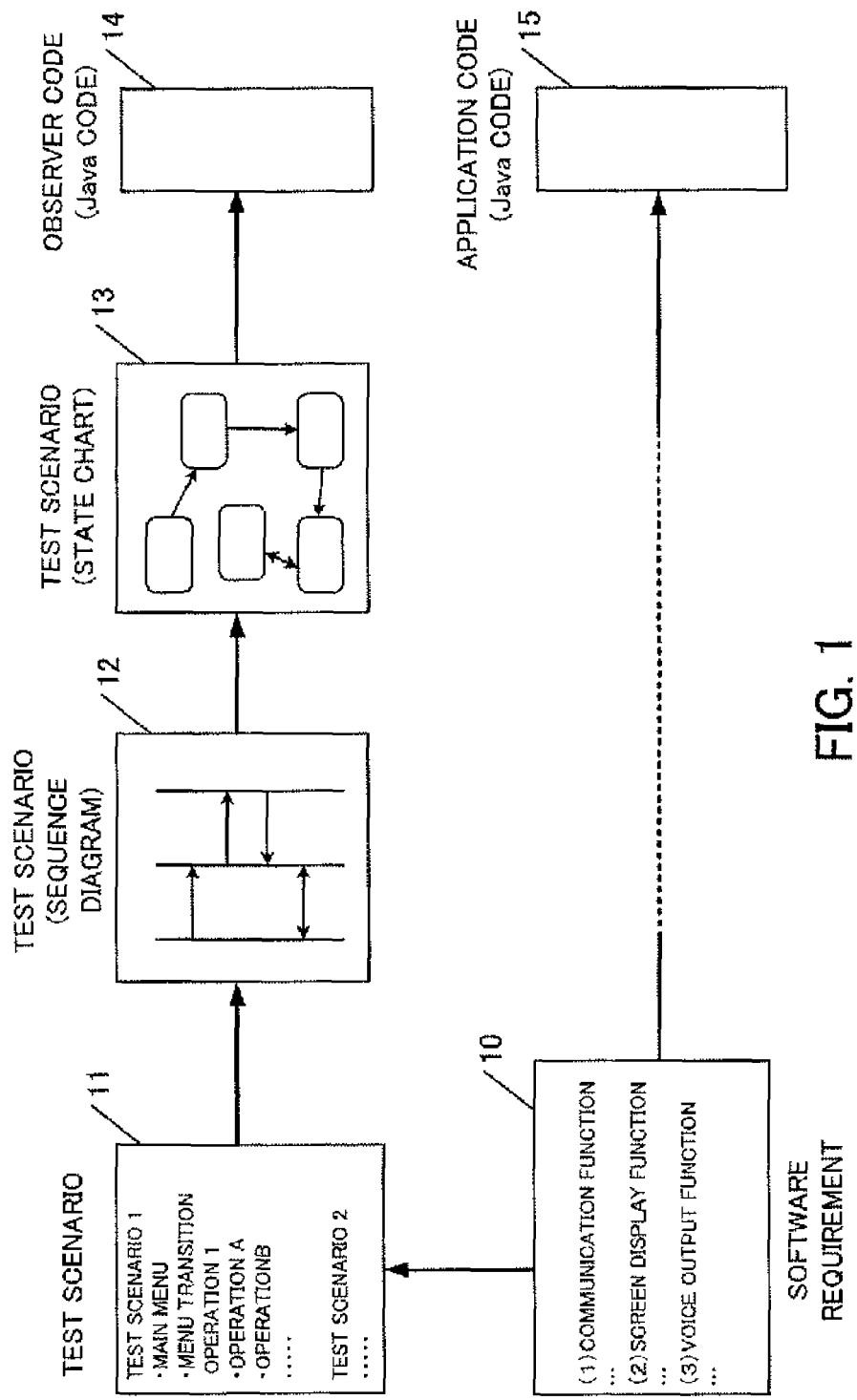
FIG. 1 is a view for explaining a method for generating an observer code and an application code.

The summary of a method for developing a monitoring program according to the present invention and a computing program serving as a monitoring target will be described. FIG. 1 is a view for explaining a method for generating the computing program and the monitoring program according to the present invention. In the present embodiment, an example in which a Java (registered trademark) application is generated by using Eclipse as an open-source integrated development environment will be described.

When software is generated, it is necessary to define a software requirement (the reference numeral 10) as the base of design first. The software requirement is a defined requirement to be satisfied by the software. The software requirement may be described in natural language or may also be described in a language such as a specification and description language that can be interpreted by a computer directly.

A software developer designs a program from the defined software requirement, and performs generation of an application code (the reference numeral 15) as the source code for the computing program. Herein, the description of the program design is omitted but, for example, a software model may be generated from the software requirement and the code may be generated, or the program design may be generated from the software requirement and coding may be performed manually. Existing techniques and methods can be used for the generation of the application code 15.

In addition, the software developer generates a test scenario (the reference numeral 11) from the software requirement. The test scenario is a scenario described in natural language that is used for testing the program. In the scenario, a series of operations by a user and results of the operations are described, and the developer performs the test of the application code 15 while referring to the scenario.

The test scenario can also be described in UMl, (United Modeling Language). For example, when a sequence diagram (the reference numeral 12) is used, it is possible to describe the type of calling performed between objects with the operation of the user used as a trigger. In addition, when a state chart (the reference numeral 13) is used, it is possible to describe the state change of the object resulting from the operation of the user. FIG. 1 shows an example in which the test scenario (the reference numeral 11) described in natural language, the test scenario (the reference numeral 12) by the sequence diagram, and the test scenario (the reference numeral 13) by the state chart are generated in the order shown, but it is only necessary to generate any of the test scenarios, and it is not necessary to generate all of the test scenarios.

An observer code (the reference numeral 14) is a code generated based on the test scenario, and is the source code for the monitoring program that monitors whether or not the computing program operates according to the test scenario. For example, as a technique for automatically generating the observer code from the state chart described in UML, there is IBM's Rational Rhapsody (registered trademark). Herein, the example in which the observer code is automatically generated from the state chart has been described, but the observer code may also be manually generated by referring to the test scenario (the reference numeral 11) described in natural language or the test scenario (the reference numeral 12) by the sequence diagram. The observer code 14 is generated for each test scenario described above.

The observer code 14 and the application code 15 are independent of each other, and hence, even when the monitoring program is generated from the observer code, the monitoring program cannot monitor an input operation performed to the computing program without any alteration. To cope with this, in the present embodiment, after both of the programs are made capable of exchanging information by utilizing aspect-oriented programming, a build is performed. The detail of the aspect-oriented programming will be described later. Lastly, by writing a built module into a microcomputer or an on-board computer, an actual product is completed.

<Software Generation Device>

Figure 2:
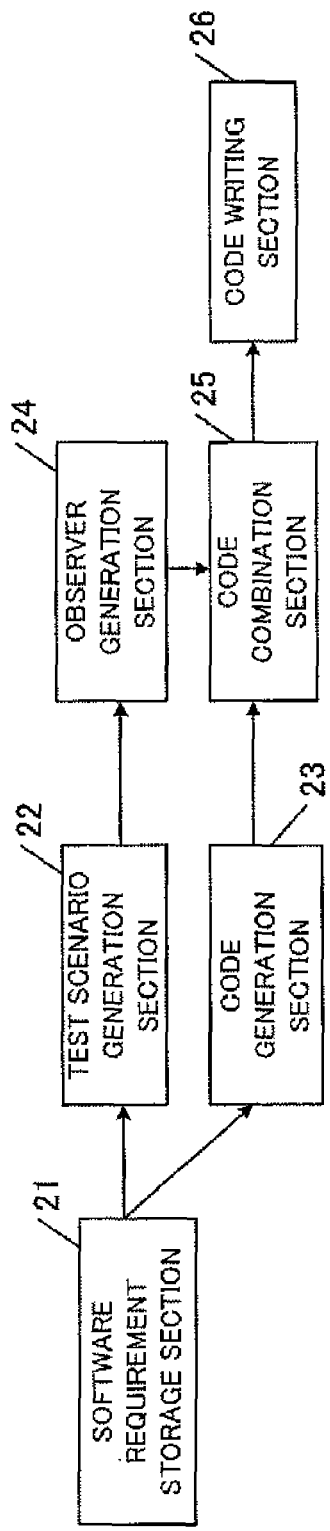
FIG. 2 is a system configuration diagram of a software generation device in the present invention.

A software generation device according to a first embodiment will be described in detail. FIG. 2 is a view showing the system configuration of the software generation device according to the present invention.

A software requirement storage section 21 is a unit that stores the software requirement (the reference numeral 10) in which the requirement to be satisfied by the software is described. The software requirement may be described in natural language or may also be described in the specification and description language for describing the specifications of the software such as LTL (Linear Temporal Logic) or CTL (Computational Tree Logic).

A test scenario generation section 22 is a unit that generates the test scenario based on the software requirement. As described above, the test scenario may be described in natural language or may also be described using the sequence diagram or the state chart. In the case where the test scenario is described in UML, it is possible to use various UML plug-ins provided for Eclipse. The software developer generates the test scenario using an editor provided by the test scenario generation section 22.

A code generation section 23 is a unit that generates the application code 15. The code may be generated by manual coding using the editor, or a software model is generated and the code may also be automatically generated from the software model. It is possible to use various design tools provided for Eclipse also in the generation of the software model and the generation of the application code. For, example, when the development tool such as MathWork's Simulink (registered trademark) is used, it is possible to automatically generate the application code from the software model.

An observer generation section 24 is a unit that generates the observer code from the test scenario generated in the test scenario generation section 22. As described above, since one observer code corresponds to one test scenario, in the case where a plurality of the test scenarios are present, a plurality of the observer codes are generated by the observer generation section 24.

In the case where the state chart is generated in the test scenario generation section 23, it is possible to automatically generate the Java observer code by Rational Rhapsody described above. The observer code may also be manually generated from the test scenario (the reference numeral 11) in natural language or the test scenario the reference numeral 12) by the sequence diagram.

A code combination section 25 is a unit that combines and builds the observer code generated by the observer generation section 24 and the application code generated by the code generation section 23. As described above, since the observer code and the application code are independent of each other, they cannot refer to each other mutually without any alteration, and cannot monitor the input operation performed to the computing program. To cope with this, in the present embodiment, transfer of the input operation between the codes is realized by using the aspect-oriented programming.

The aspect-oriented programming will be described. The aspect-oriented programming is a technique for incorporating a concept that cannot be classified using the object into the program. When the aspect-oriented programming is used, it is possible to incorporate a function difficult to classify that is additional processing different from original functional processing such as, e.g., logging, assertion, or error processing in the program. This processing is called an aspect, and an execution point at which the aspect is incorporated is called a joint point. That is, by setting processing for transferring the input operation to the observer code as the aspect and disposing the joint point in the observer code and the application code, it is possible to transfer the input operation by the user. Thus, the software developer can add the function without altering the generated code only by generating the aspect and specifying the joint point.

AspectJ is a representative example of an aspect-oriented language. AspectJ is a language in which specifications for realizing the aspect-oriented programming are added to Java language. The code combination section 25 couples the application code and the observer code using AspectJ. Specifically, the code of transferring the input operation is generated as the aspect, and the joint point is defined at a part to which the input operation is transferred in each of the application code and the observer code. With this, it becomes possible for the monitoring program to acquire the input operation to the computing program. The combination of the code is performed by using an AspectJ plug-in provided for Eclipse.

Figure 3:
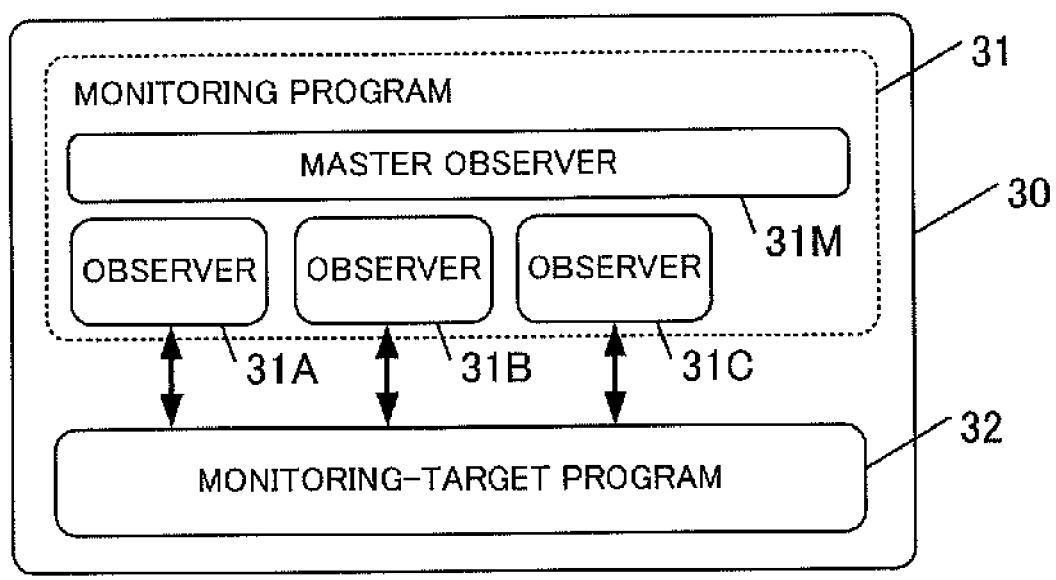
FIG. 3 is a view showing the configuration of an executable program in the present invention.

FIG. 3 is a view showing the configuration of the program generated by the software generation device according to the first embodiment. Note that in the description of the embodiment, the computing program generated from the application code is referred to as a monitoring-target program, and the monitoring program generated from the observer code is referred to as an observer.

The application code and the observer code are built by the code combination section 2b and an executable program 30 is generated. The executable program 30 includes a monitoring-target program 32 as a program corresponding to the application code, and a plurality of observers 31A, 31B, 31C . . . as programs corresponding to the individual observer codes. The input operation performed to the monitoring-target program is inputted to each observer substantially simultaneously. Note that the monitoring-target program and each observer may be stored in one module or may also be stored in a plurality of modules separately as long as a condition that the monitoring-target program and each observer are executed simultaneously is satisfied. A master observer 31M is a program for checking the states of the plurality of the observers. The master observer 31M is stored in the observer generation section 24 as a common program that does not depend on the application, and is built simultaneously in the code combination section 25. The area of the reference numeral 31 shown in FIG. 3 is the monitoring program in the present invention. The operation of the master observer will be described later.

The generated executable program 30 is written in a storage device (ROM) of a computer that operates in actual environment in a code writing section 26. The computer that operates in actual environment is, e.g., an on-board computer (ECU) mounted on an automobile or the like.

Figure 4:
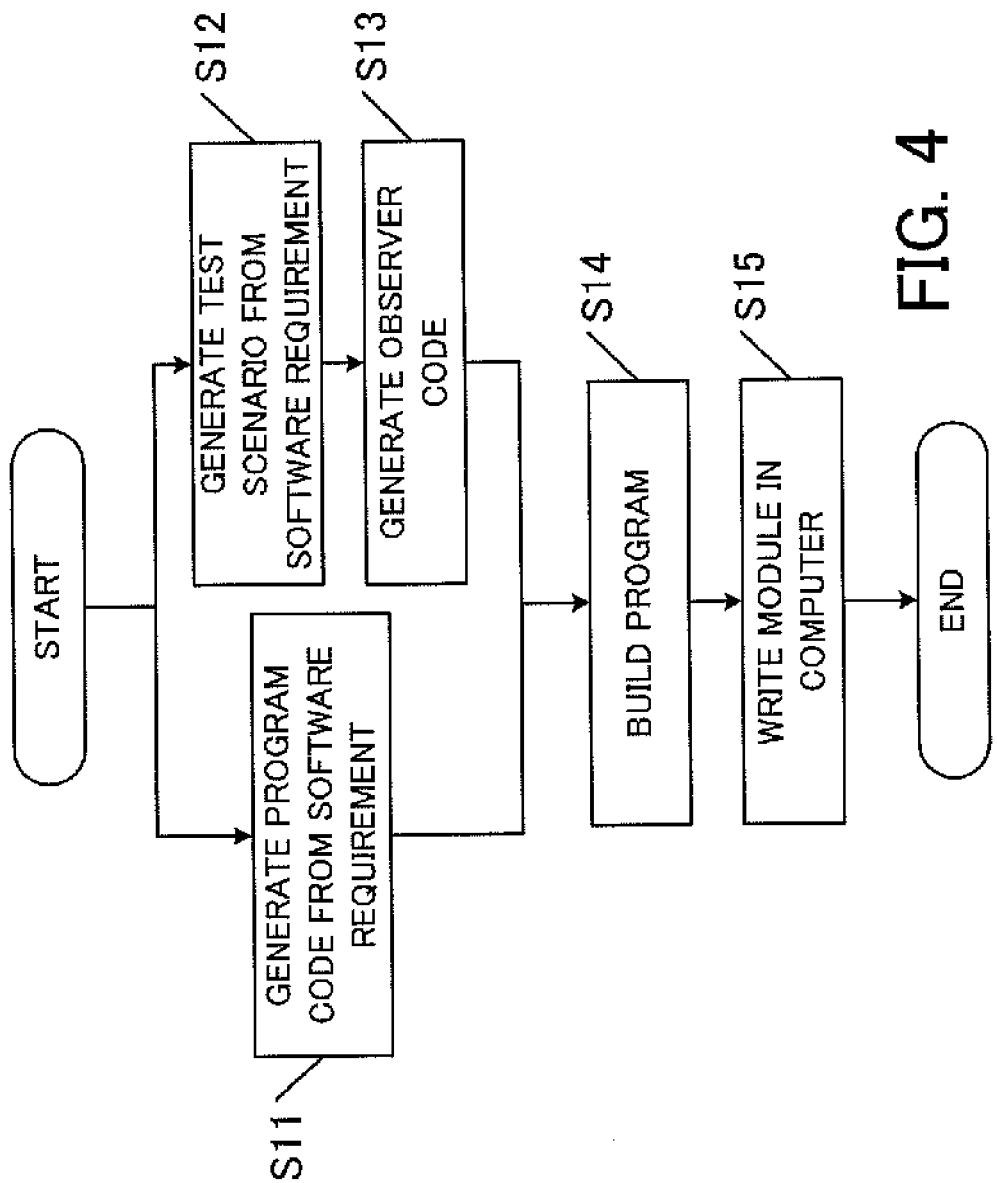
FIG. 4 is a flow chart of software development.

FIG. 4 is a flow chart showing software development procedures according to the first embodiment. The software developer generates the application code from the software requirement in the code generation section 23 (S11), and designs the test scenario from the software requirement in the test scenario generation section 22 (S12). One of the procedure in Step S11 and the procedure in Step S12 may be performed before the other thereof, or both of the procedures may be performed concurrently.

Subsequently, the software developer generates the observer code from the test scenario in the observer generation section 24 (S13), and then builds both of the application code and the observer code in the code combination section 25 (S14). With this, the executable program 30 is obtained. Lastly, the software developer writes the generated executable program 30 in a target computer in the code writing section 26 (S15), and the software development is completed.

<Method for Monitoring Program>

Figure 5:
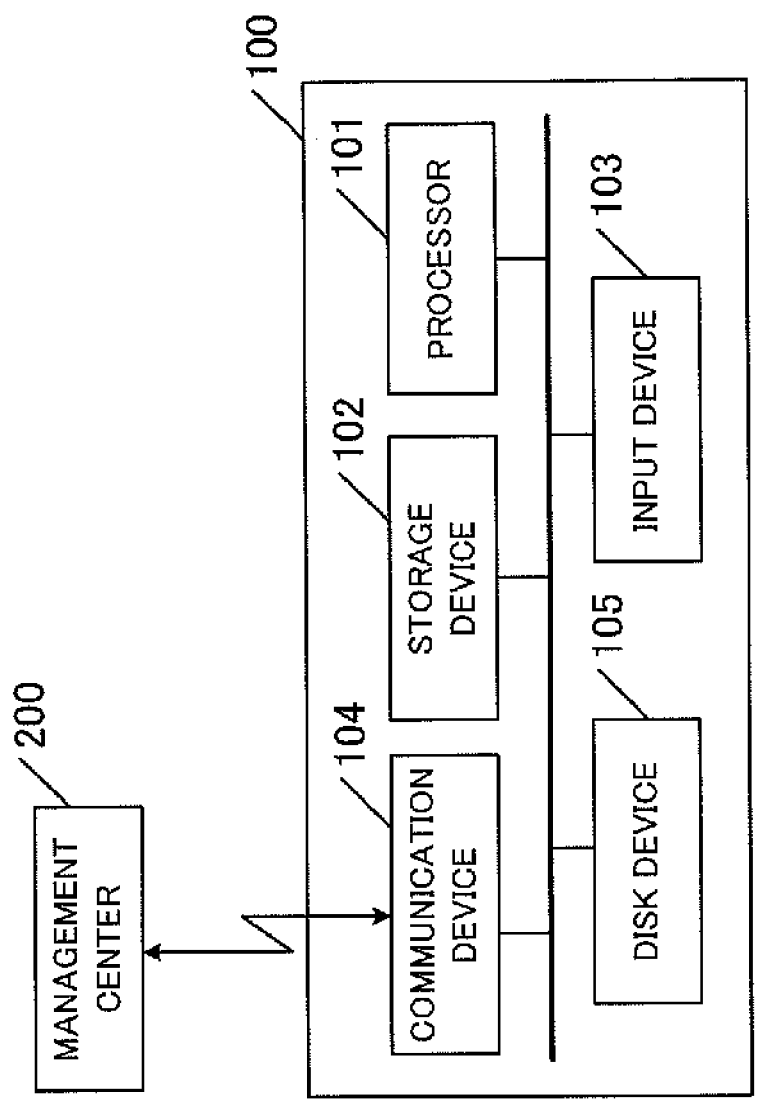
FIG. 5 is a system configuration diagram of a computer according to a first embodiment.

Next, the operation of the program written in the computer will be described. In the present embodiment, the computer is an on-board terminal mounted on a vehicle. FIG. 5 is a system configuration diagram of an on-board terminal 100 in which the executable program 30 is executed.

The on-board terminal 100 has a processor 101 and a storage device 102. The executable program 30 is stored in the storage device 102, and is executed in the processor 101. The user can perform an input to the monitoring-target program 32 through an input device 103. The input device 103 is a touch panel in the present embodiment, but may also be a keyboard or a pointing device.

The on-board terminal 100 has a communication device 104 for performing radio communication with the outside and a disk device 105 for recording information.

Figure 6:
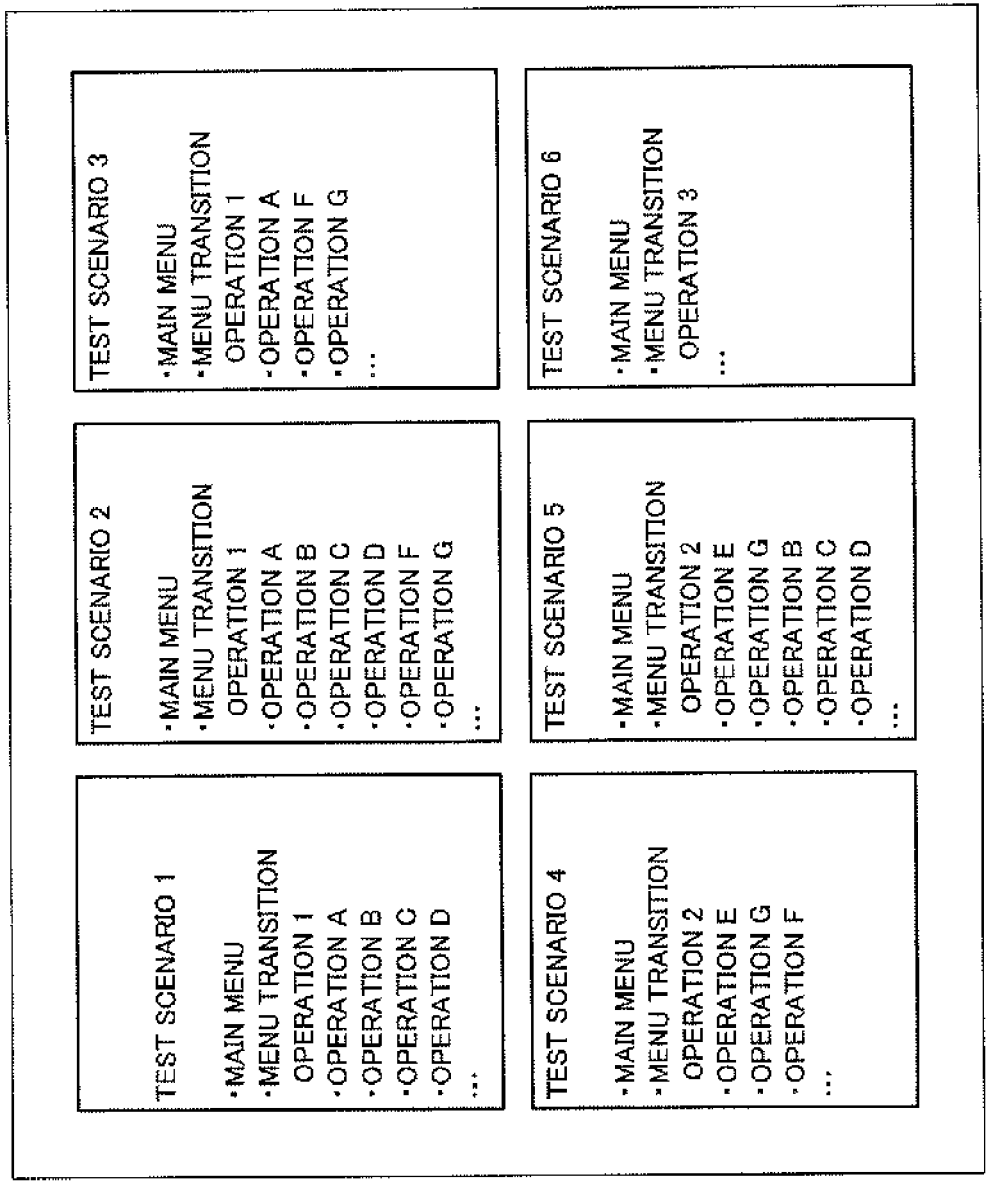
FIG. 6 shows examples of a test scenario used to monitor a program.
Figure 7:
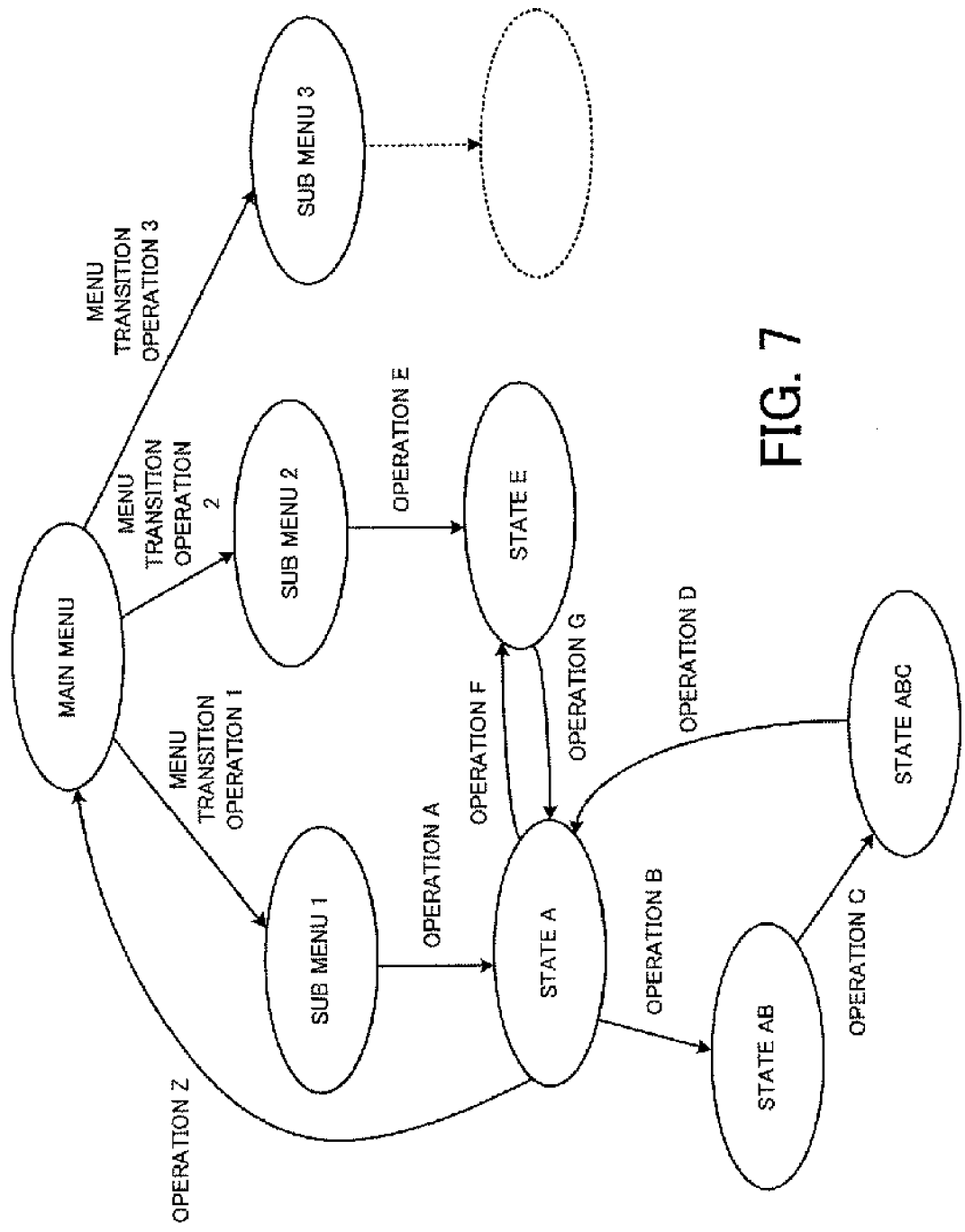
FIG. 7 is a view for explaining the state transition of the program by an input operation.

A method in which the observer determines whether or not the input operation to the monitoring-target program corresponds with the test scenario will be described based on a specific example. FIG. 6 shows an example of the test scenario of each observer. FIG. 7 is a view showing the state transition of the monitoring program by the operation of the user. For example, after transition from Main Menu to Sub-menu 1, the operations can be performed in the order of Operation A, Operation B, Operation C, and Operation D. The test scenario corresponding to this series of operations is Test Scenarios 1 and 2. In each test scenario, the order of the operations when the test of the program is performed is recorded, and each of the observers (31A, 31B, 31C . . . ) stores one test scenario. In the present example, six observers are used to monitor all of the test scenarios shown in FIG. 6.

As long as the input operation currently performed by the user matches the operation recorded in the test scenario stored in any of the observers, it can be seen that the operation is the operation of which the operation confirmation is made at the stage of the program test. Conversely, in the case where the operation that does not match any of the test scenarios is performed, it is possible to determine that the current state is a state where the operation confirmation is not made, i.e., an unchecked state.

A method for determining which test scenario the input operation currently performed by the user matches will be described by using a term activity/inactivity of the observer. "The observer is in an active state" means a situation in which the input operation performed by the user matches the test scenario of the observer. "The observer is in an inactive state" means a situation in which the operation performed by the user does not match the test scenario of the observer. Each observer can switch the state thereof (the active state/the inactive state) in accordance with the result of the comparison between the acquired input operation and test scenario stored in the observer.

A description will be given by using a specific example. The test scenario starts from a screen serving as a starting point. In the example in FIG. 6, a main menu screen is the starting point of all of the test scenarios. That is, the state where the monitoring-target program displays the main menu is the state corresponding to all of the test scenarios, and all of the observers are brought into the active state.

The operation performed by the user is inputted to the monitoring-target program first. The joint point is defined together with a function for acquiring the input operation in the code of the monitoring-target program, and the aspect is executed every time the user performs the input operation. In the aspect, processing for acquiring the input operation and transmitting the input operation to the observer is described. With this, the inputted operation is transmitted to all of the observers.

For example, when "MENU TRANSITION OPERATION 1" is performed, the operation is transmitted to all of the observers. This operation is the operation corresponding only to TEST SCENARIOS 1 to 3, and hence only the observers corresponding to TEST SCENARIOS 1 to 3 are brought into the active state, and the other observers are brought into the inactive state. Thus, as the operation proceeds, the number of observers in the active state is reduced. When the operation returns to Main Menu as the starting point again, all of the observers are brought back into the active state. Thus, the state of each observer is switched between the active state and the inactive state as required according to the operation of the user.

For example, the list of the observer in the active state in the case where the following operations are performed from Main Menu in the order shown is as follows. Note that, for the convenience of the description, the observers corresponding to TEST SCENARIOS 1 to 6 shown as examples are referred to as Observers 1 to 6.
(1) Initial state (Main Menu) Observers 1, 2, 3, 4, 5, 6
(2) MENU TRANSITION OPERATION 1: Observers 1, 2, 3
(3) OPERATION A: Observers 1, 2, 3
(4) OPERATION F: Observer 3
(5) OPERATION G: Observer 3
(6) OPERATION Z: Observers 1, 2, 3, 4, 5, 6

In the present example, since Main Menu is the starting point of each test scenario, by performing OPERATION Z, all of the observers are brought back into the active state.

Figure 8:
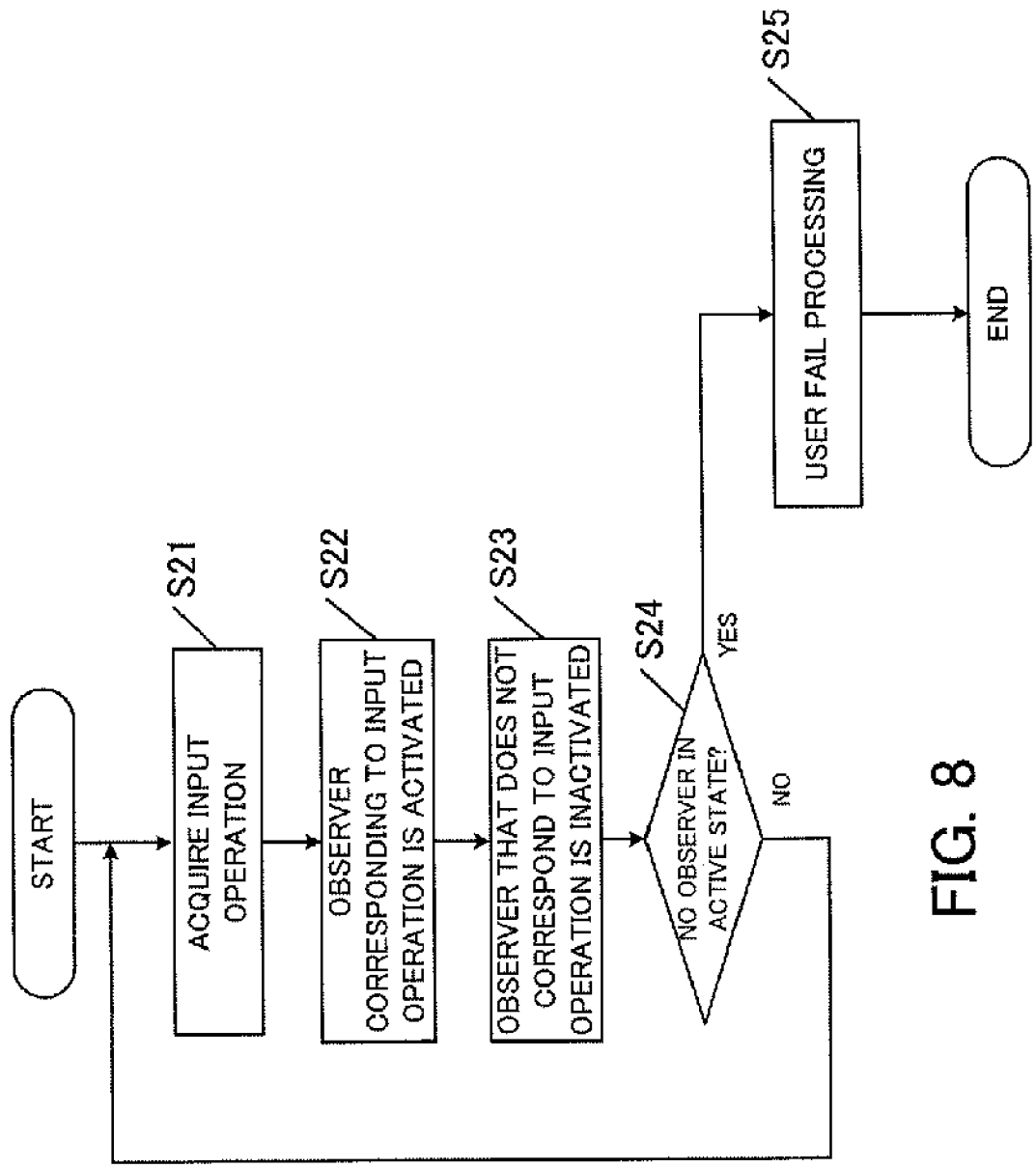
FIG. 8 is a flow chart of processing of the computer according to the first embodiment.

The monitoring program 31 according to the present embodiment can determine whether or not the monitoring-target program 32 is in a checked state based on the active state of the observer. Monitoring processing performed by the monitoring program 31 that operates on the on-board terminal 100 is shown by a flow chart in FIG. 8. When the executable program 30 is started on the on-board terminal 100, the flow chart in FIG. 8 is started.

First, in Step S21, every time the user performs the input operation, all of the observers acquire the input operation. Next, in Step S22 and Step S23, each observer compares the operation acquired in Step S21 with the test scenario of the observer. As the result, in the case where the observer is the activation target, the observer switches its state to the active state (S22) and, in the case where the observer is the inactivation target, the observer switches its state to the inactive state (S23). The observer in the inactive state notifies the master observer 31M that the observer is inactivated.

Step S24 is Step of detecting that all of the observers are in the inactive state. Specifically, the master observer 31M counts the number of observers in the active state. At this point, in the case where there is no observer in the active state, that means that the operation that does not exist in the test scenario is performed, and hence the processing proceeds to Step S25, and the master observer 31M generates an event called user fail. The user fail is an event that provides a notification that the program is brought into the unchecked state. For example, in the case where a system for controlling a vehicle is brought into the user fail state, it is conceivable to change the mode of the system to a safe mode that is a minimal configuration required for driving. In the case where the situation is considered to be relatively safe, a notification may be provided only to a driver.

When the user fail is generated, the master observer 31M starts an external program for providing notification of an abnormality, and the external program notifies the driver of the occurrence of the abnormality through a display (not shown) such as LED or LCD. In addition, relevant information is recorded in the disk device 105 as a log. The information to be recorded includes logs of memory dump of the program and the operation performed by the user. Note that the log information may be transmitted to a management center 200 through the communication device 104. In addition, the notification of the occurrence of the abnormality may be provided to the monitoring-target program.

Note that, in the case where one or more observers in the active state are present, the processing proceeds to Step S21 and waits for the input operation again.

According to the present embodiment, the observer executed on the computer monitors the input to the monitoring-target program, and it is thereby possible to detect that the input operation having the untested pattern is performed by the user. With this, it is possible to provide a notification before the system becomes critical and increase the safety of the system.

Note that, in the first embodiment, the master observer generates the user fail in the case where all of the observers are brought into the inactive state, but there may be provided another program for checking the active state of the observer and the program may generate the user fail in the case where all of the observers are brought into the inactive state.

In addition, in the first embodiment, the operation is ended after the required processing is performed in the case where the user fail is generated, but the monitoring may be continued after recovery processing is performed in the case where the observer is activated again after the user fail is generated. The recovery processing may be processing for notifying the outside that the checked state is established again, or may also be processing for changing the mode of the system from the safe mode back to a normal mode.

Further, in the present embodiment, the main menu is used as the starting point of each test scenario and the activation of all of the observers is performed when the screen is changed to the main menu, but the timing of the activation of the observers can be set to any timing according to the test scenario. For example, there may be observers activated when the screen is changed to the sub-menu, and there may also be observers activated when an arbitrary condition is satisfied.

Moreover, the language to be used may be a language other than Java. As long as an aspect-oriented framework can be used, the language may be, e.g., C language, C++ and, when the observer can be notified of the input operation to the monitoring-target program by some method, it is not necessary to use the aspect-oriented programming. For example, when Embedded Tester as the development tool by BTC Embedded Systems AG is used, it is possible to connect the observer and the program generated in C language and execute the monitoring of the program.

Second Embodiment

Figure 9:
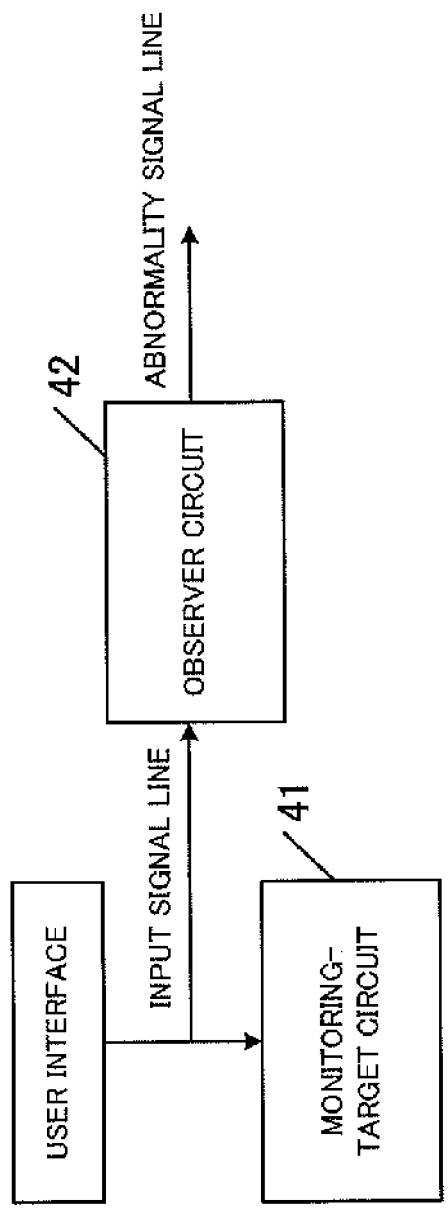
FIG. 9 is a view showing a circuit structure according to a second embodiment.

A second embodiment is an embodiment in which the monitoring-target program and the observer operate on pieces of hardware that are independent of each other. FIG. 9 is a view showing a circuit structure according to the second embodiment.

In the present embodiment, similarly to the first embodiment, the generation of the program is performed by the software generation device, but the second embodiment is different from the first embodiment in the following points.

Specifically, the codes generated in the code generation section 23 and the observer generation section 24 are not in Java but in hardware description language such as AHDL VHDL. In addition, the combination of the code in the code combination section 25 is not performed, and the monitoring-target program and the observer are built separately. Further, in the code writing section 26, the monitoring-target program and the observer are written in digital circuits such as integrated circuits or the like separately.

The development procedures of the software are the same as those in the flow chart shown in FIG. 4.

FIG. 9 is a view showing the relationship between a monitoring-target circuit 41 in which the monitoring-target program is written and an observer circuit 42 in which a plurality of the observers are written. The monitoring-target circuit 41 is a circuit in which the program serving as the monitoring target, i.e., the monitoring-target program 32 in the first embodiment is executed. The observer circuit 42 is a circuit in which the program that performs the monitoring, i.e., the master observer 31M and the plurality of the observers (31A, 31B, 31C . . . ) in the first embodiment are executed. In the present embodiment, the observer circuit 42 acquires an operation signal inputted from a user interface to the monitoring-target circuit 41 via an input signal line, and performs the processing shown in FIG. 8. In the case where the user fail processing is generated, the observer circuit 42 provides an abnormality notification to the outside through an abnormality signal line.

In the case where the abnormality notification is provided, a circuit that controls the system can acquire the abnormality notification and take the same measures as those in the first embodiment. For example, a notification may be provided to the user or a mode in which a part of the system is restricted may be established. In addition, the corresponding circuit may be separated from the system.

According to the present embodiment, the present invention can be applied to the program operating not on the computer but on the integrated circuit. The first embodiment operates on the single computer. In contrast, in the present embodiment, the observers are written in another integrated circuit, and hence the present embodiment has an advantage that it is possible to design the circuit in which the monitoring-target system operates and the circuit in which the observers operate separately.

(Modification)

Note that the description in each embodiment is only illustrative for purposes of description of the present invention, and the present invention can be implemented with appropriate modifications and combinations without departing from the gist of the invention. For example, a plurality of the embodiments may be combined, and a notification may be provided to the user by a method that is not described in the first embodiment in the case where an operation that is not included in the specifications is detected.

In the description of the embodiments, the activation and the inactivation of the observer are performed every time the user performs the input operation, but the input operation that is not related to the test scenario may be discarded in Step S21. For example, in the case where the input is made through the keyboard and the input is made to a text box, the processing in Step S21 may be suspended and a standby state may be maintained until an input determination button is pressed.

In addition, in the description of the embodiments, simple inputs for changing the state of the program such as a click and a tap are shown as examples of the input operation, but the input operation may also be an operation involving an input value. For example, in the case where the operation defined in the test scenario is "input a character string within 10 characters", and 11 or more characters are inputted, it may be determined that the operation does not correspond to the test scenario and the observer may be inactivated. Thus, as the input operation recorded in the test scenario, any input operation may be defined as long as the input operation is related to the operation by the user.

The present invention performs the determination of the checked state/the unchecked state based on the input operation by the user, and a function of determining a match with the test scenario based on input data from the outside may be added to the present invention or a function of determining the match with the test scenario based on data generated in the system may be added thereto. Thus, the present invention can be applied to various devices as long as the device compares the test scenario with the actual operation.

REFERENCE SIGNS

10 SOFTWARE REQUIREMENT
11 TEST SCENARIO
12 SEQUENCE DIAGRAM
13 STATE CHART
14 OBSERVER CODE
15 APPLICATION CODE
21 SOFTWARE REQUIREMENT STORAGE SECTION
22 TEST SCENARIO GENERATION SECTION
23 CODE GENERATION SECTION
24 OBSERVER GENERATION SECTION
25 CODE COMBINATION SECTION
26 CODE WRITING SECTION
100 ON-BOARD TERMINAL
101 PROCESSOR
102 STORAGE DEVICE
103 INPUT DEVICE
104 COMMUNICATION DEVICE
105 DISK DEVICE
200 MANAGEMENT CENTER

The invention claimed is:

1. A computer comprising:
an input unit configured to acquire an input operation;
a first program execution unit configured to execute a computing program performing a computation based on the input operation acquired by the input unit;
a test scenario storage unit configured to store a plurality of test scenarios for the computing program; and
a second program execution unit configured to execute a monitoring program determining whether or not the input operation acquired by the input unit corresponds to any of the plurality of the stored test scenarios.

2. The computer according to claim 1, wherein
each of the test scenarios includes details and an order of a plurality of the input operations.

3. The computer according to claim 2, wherein
the monitoring program acquires a plurality of the input operations from the input unit and, in a case where the plurality of the acquired input operations match the details and the order of the input operations included in any of the test scenarios, the monitoring program determines that the acquired input operation corresponds to the test scenario.

4. The computer according to claim 1, wherein
the monitoring program notifies the computing program or an external program that a system is in an unchecked state in a case where the acquired input operation does not correspond to any of the plurality of the stored test scenarios.

5. A non-transitory computer readable medium containing a monitoring program executed simultaneously with a computing program performing a computation and monitoring an input operation to the computing program, the program comprising:

an input acquisition step of acquiring the input operation to the computing program; and an input determination step of determining whether or not the acquired input operation corresponds to any of a plurality of pre-stored test scenarios for the computing program.

6. The non-transitory computer readable medium according to claim 5, wherein each of the stored test scenarios includes details and an order of a plurality of the input operations.

7. The non-transitory computer readable medium according to claim 6, wherein the input acquisition step includes acquiring a plurality of the input operations, and in a case where the plurality of the acquired input operations match the details and the order of the input operations included in any of the test scenarios, the input determination step includes determining that the acquired input operation corresponds to the test scenario.

8. The non-transitory computer readable medium according to claim 5, wherein in a case where the acquired input operation does not correspond to any of the plurality of the stored test scenarios in the input determination step, a step of notifying the computing program or an external program that a system is in an unchecked state is executed.

9. A hardware processor generating a computing program performing a computation and a monitoring program monitoring an input operation to the computing program, the hardware processor comprising:

a computing program input unit configured to receive an input of a code of the computing program;

a test scenario input unit configured to receive an input of a plurality of test scenarios for the computing program that are described in a modeling language;

a computing program generation unit configured to generate the computing program;

a monitoring program generation unit configured to generate the monitoring program including the plurality of the test scenarios and determining whether or not the input operation to the computing program corresponds to any of the plurality of the test scenarios; and a program writing unit configured to record the computing program and the monitoring program in an object computer, wherein the computing program generation unit adds processing for notifying the monitoring program of the input operation performed to the computing program, with predetermined processing being performed by the computing program used as a trigger on the computing program.

10. The hardware processor according to claim 9, wherein each of the test scenarios includes details and an order of a plurality of the input operations.

11. The hardware processor according to claim 10, wherein the monitoring program acquires a plurality of the input operations and, in a case where the plurality of the acquired input operations match the details and the order of the input operations included in any of the test scenarios, the monitoring program determines that the acquired input operation corresponds to the test scenario.

12. The hardware processor according to claim 9, wherein the monitoring program is capable of notifying the computing program or an external program that a system is in an unchecked state in a case where the acquired input operation does not correspond to any of the plurality of the test scenarios.

* * * * *